Aug. 26, 1958 C. MORTON 2,848,933
LAWN EDGER
Filed July 25, 1955
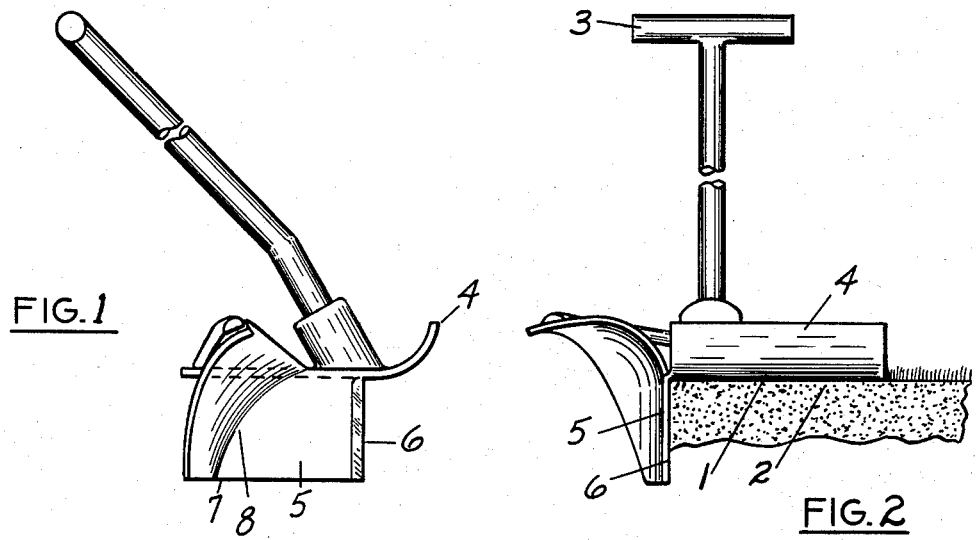
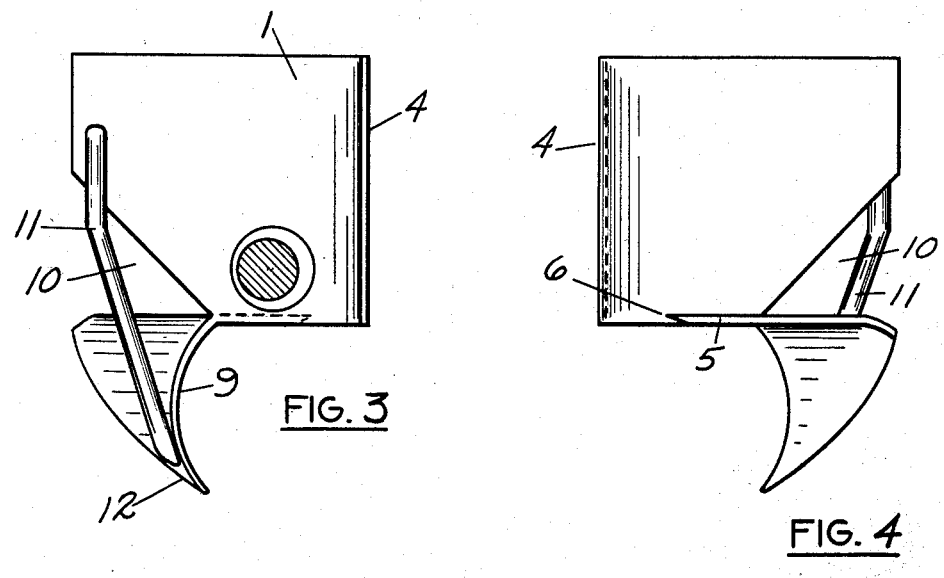
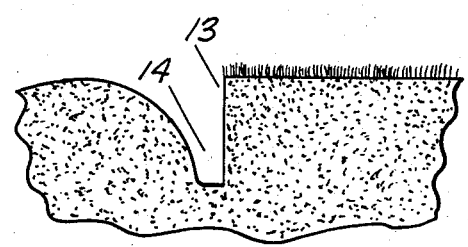
INVENTOR.
Carl Morton
BY Ralph Hammar
attorney

United States Patent Office 2,848,933
Patented Aug. 26, 1958

2,848,933

LAWN EDGER

Carl Morton, Erie, Pa.

Application July 25, 1955, Serial No. 523,976

1 Claim. (Cl. 97—227)

This invention is a lawn edger for trimming around flower beds and the like which simultaneously trims the sod and ploughs a furrow at the cut edge of the lawn. In a preferred form the edger has a shoe which slides on the lawn at one side and has a depending knife blade having a sharp front edge which cuts the sod. The knife has its top and back curved to turn a furrow away from the cut edge of the sod.

In the drawing:

Fig. 1 is a side view;
Fig. 2 is a front view;
Fig. 3 is a top view;
Fig. 4 is a bottom view, and
Fig. 5 is a fragmentary section through the trimmed lawn edge.

The edger has a flat shoe or skid 1 having a smooth bottom surface which rides on the surface 2 of the lawn as the edger is pushed by a handle 3 suitably fixed to the top of the shoe close to one side of the shoe and slightly to the rear of the front end of the shoe. The shoe has an upturned front end 4 which keeps it from digging in.

At one side of the shoe is a knife blade 5 depending at substantially right angles from one side of the shoe. The knife blade has a sharp front edge 6 which trims the sod. The edge 6 is opposite the connection between the handle and shoe so the pushing forces are transmitted directly to the cutting edge and do not tend to rock the shoe. The bottom edge 7 of the knife blade extends rearwardly behind the handle and tracks behind the cutting edge from a point opposite the handle to a point behind the handle so as to prevent wobbling of the cut. The bottom edge is slightly relieved toward the rear to provide cutting clearance. The back end of the knife blade is concave so as to turn a furrow. The concave shape starts at line 8 and the lateral projection or extent becomes greater from the bottom toward the top of the knife blade. The top edge 9 of the back end of the blade which is made from the material cut out of the triangular notch 10 at the rear of the shoe is more concave than the bottom and projects a much greater distance from the shoe. The concave back end of the blade turns a furrow of width progressively increasing from the bottom of the furrow toward the surface of the ground. A strut 11 extending from the top surface of the shoe to the tip 12 braces the concave section of the blade. The shoe and knife blade can be made from one piece of sheet metal by simple cutting and bending operations.

In the use of the edger, the shoe rides on the surface of the lawn as shown in Fig. 2 and the sharp front edge 6 of the knife blade trims the sod at 13 (Fig. 5).

The concave back end of the knife blade turns a furrow 14 of width progressively increasing toward the surface of the ground. The handle 3 is close to the knife blade so the pushing force tends to hold the shoe flat and to prevent tilting of the knife blade. The furrow 14 accordingly is of constant depth measured from the surface of the lawn and no special effort is needed to keep the furrow straight. From one aspect, the rear edge of the concave back end of the knife blade acts as a scraper determining the contour of the furrow.

What is claimed as new is:

In a lawn edger, an elongated shoe having a flat bottom surface for sliding on the surface of the lawn and an upwardly curved front end to keep the shoe from digging in, an elongated knife blade depending from one side edge of the shoe and extending from adjacent the upwardly curved front end to the rear of the shoe, said knife blade having a sharp vertical cutting edge at the front of the blade adjacent and to the rear of the upwardly curved front end of the shoe, said blade having a bottom edge extending to the rear of the shoe and tracking in the cut made by the vertical cutting edge and a back end concavely curved outwardly away from the shoe and acting to turn a furrow, the concave curvature of the knife blade starting at generally a diagonal line closer to the front edge of the knife blade at the top than at the bottom and said concave portion having a lateral projection increasing toward the top of the blade whereby the furrow increases in width from the bottom of the furrow toward the top, a handle inclined rearwardly and upwardly from the shoe and having its lower end fixed to the shoe close to said one side of the shoe and to the rear of the upwardly curved front end of the shoe and substantially directly above the vertical cutting edge so the vertical and forward components of the pushing force are directly transmitted to the cutting edge and do not tend to rock the shoe or tilt the blade.

References Cited in the file of this patent

UNITED STATES PATENTS

| | | |
|---|---|---|
| 396,714 | Stevens | Jan. 22, 1889 |
| 962,785 | Reichert | June 28, 1910 |
| 1,699,071 | Kinney | Jan. 15, 1929 |
| 2,476,461 | Smith | July 19, 1949 |
| 2,563,031 | Gordon | Aug. 7, 1951 |